US006553914B2

(12) United States Patent
Hosey et al.

(10) Patent No.: US 6,553,914 B2
(45) Date of Patent: Apr. 29, 2003

(54) GAS GENERATOR (75) Inventors: Edward Otis Hosey, Lakeland, FL (US); Keith Hing Lam, Lakeland, FL (US); J B Canterberry, Apollo Beach, FL (US)

(73) Assignee: Breed Automotive Technology, Inc., Lakeland, FL (US)

( * ) Notice: Subject to any disclaimer, the term of this patent is extended or adjusted under 35 U.S.C. 154(b) by 11 days.

(21) Appl. No.: 09/829,686

(22) Filed: Apr. 10, 2001

(65) Prior Publication Data

US 2002/0145275 A1 Oct. 10, 2002

(51) Int. Cl.[7] .............................................. B60R 21/26
(52) U.S. Cl. ................... 102/530; 102/202.14; 280/741
(58) Field of Search .......................... 102/202.14, 530, 102/531; 86/1.1, 10; 280/736, 741

(56) References Cited

U.S. PATENT DOCUMENTS

| | | | | |
|---|---|---|---|---|
| 2,968,985 A | * | 1/1961 | Seavey | 102/202.14 |
| 3,831,523 A | * | 8/1974 | Thomas et al. | 102/202.14 |
| 3,971,320 A | * | 7/1976 | Lee | 102/202.14 |
| 4,576,094 A | * | 3/1986 | Meador | 102/202.14 |
| 5,178,547 A | * | 1/1993 | Bonas et al. | 102/531 |
| 5,221,109 A | * | 6/1993 | Marchant | 102/530 |
| 5,423,261 A | * | 6/1995 | Bernardy et al. | 102/202.14 |
| 5,763,814 A | * | 6/1998 | Avory et al. | 102/530 |
| 6,009,809 A | * | 1/2000 | Whang | 102/202.14 |
| 6,056,319 A | * | 5/2000 | Ruckdeschel et al. | 280/741 |
| 6,071,364 A | | 6/2000 | Canterberry et al. | 149/35 |
| 6,073,963 A | | 6/2000 | Hamilton et al. | 280/741 |
| 6,167,808 B1 | * | 1/2001 | Mramor | 102/531 |

* cited by examiner

Primary Examiner—Harold J. Tudor
(74) Attorney, Agent, or Firm—Jarett Rieger; Lonnie Drayer (57) ABSTRACT

A gas generator according has a polymeric closure and an igniter subassembly comprising an igniter and a polymeric gas generator body. The gas generator body and the polymeric closure define a hermetically sealed combustion chamber for receiving a gas generant. The igniter receives an electrical current and ignites the gas generant. The generated gas can be used in vehicle occupant safety devices including seat belt pretensioners, airbags, compressed gas vessel openers, and other devices requiring a rapid pulse of high-pressure gas.

5 Claims, 7 Drawing Sheets

FIG-12

GAS GENERATOR

FIELD OF THE INVENTION

This invention relates to gas generators used with vehicle occupant safety devices, including without limitation, seat belt pretensioners, airbags, compressed gas vessel openers, and other devices requiring a rapid pulse of high-pressure gas.

BACKGROUND OF THE INVENTION

Gas generators are used to inflate airbags. They can also be used to open vessels containing pressurized gas, and to tighten seat belts. More specifically, small "gas generators" are utilized with seat belt pretensioners and as a means to open vessels containing compressed gas. In a vehicle occupant restraint system an electrical current that is initiated by a crash sensor activates a gas generator. Generally, when the electrical current is received by an igniter housed within the gas generator, the ignition train is triggered resulting in ignition of the gas generant. The combustion of the gas generant produces hot gas at elevated pressures.

When a gas generator used with a seat belt pretensioner is activated, hot gas and resulting high pressure produced by combustion of the gas generant forces a piston or similar device with an attached cable to travel down a tube and remove excess slack in a seat belt. Other pretensioners employ a gas. generator to power a reel or ratchet to remove excess slack in the seat belt. Removal of slack in a seat belt is required to properly position a vehicle occupant during a crash by securing the vehicle occupant against the seat.

In a compressed gas vessel opener, the gases exiting the gas generator can be used to drive an object or place thermal or mechanical stress on a burst disk or diaphragm, resulting in punctures or general failure of the diaphragm or burst disk. Rupture or failure of the diaphragm/burst disk allows the compressed gas to escape.

Gas generators comprise igniters, which in general have a glass to metal hermetic seal or a plastic hermetic seal protecting the ignition charge material from moisture. The igniter body may have an overmold comprising a polymeric material. The overmold allows the igniter to form a seal against the gas generator as disclosed in U.S. Pat. No. 6,167,808.

The present invention relates to a gas generator that has a body or housing made entirely of a polymeric material. A polymeric gas generator body must withstand high temperatures and pressure encountered during ignition and combustion of the gas generant contained in the generator body. Another problem is related to the brisance properties of the gas generant. Brisance is a measure of a material's ability to shatter. In a plastic or polymeric gas generator, the gas generant must be of the "low brisance" type and have soft ignition and combustion properties. A gas generant of this type is described in U.S. Pat. No. 6,071,364, and it functions well in plastic gas generators. U.S. Pat. No. 6,073,963 describes an injection-molded initiator with an injection molded insert member and teaches the need for an insert member. The present invention uses no such member. Instead the entire body and polymeric end cap comprise an injection-molded plastic and form a polymeric combustion chamber that houses a gas generant. The plastic gas generator of this invention is low cost, easily assembled, light weight, and made by injection molding, or similar technology.

SUMMARY OF THE INVENTION

A gas generator according to one aspect of the present invention has a polymeric end cap and an igniter subassembly comprising an igniter and a polymeric gas generator body. The gas generator body and the end cap define a hermetically sealed combustion chamber for receiving a gas generant. The igniter receives an electrical current and ignites a gas generant. The gas generator can be attached, mounted or retained by modifying or altering the external geometry to accommodate various designs.

DETAILED DESCRIPTION OF THE INVENTION

The drawings are for purposes of illustrating preferred embodiments of the invention only and not for purposes of limiting the same. The embodiments illustrated are intended for use with a seat belt pretensioner, but may be used with other devices including, without limitation, an inflator for an airbag or an opener for a vessel containing compressed gas. An opener for a vessel containing compressed gas may be used with a passenger side or side impact airbag device, but it is not limited thereto. Gas generators according to the present invention are also believed to have utility with devices such as explosive bolts, detonators used in mining or demolition activities, military devices, puncturing devices, pullers, thrusters, valves, cutters, and underwater devices.

Figure 1:
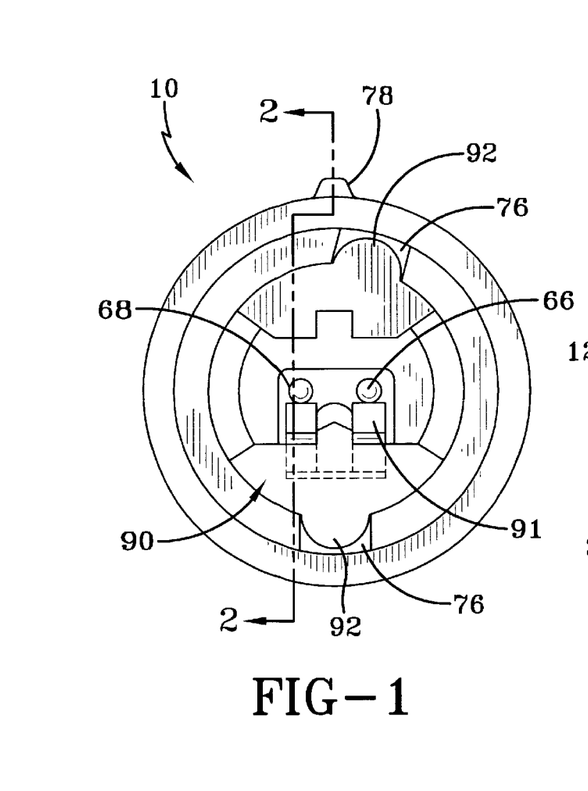
FIG. 1 is an end view of a gas generator according to the present invention.
Figure 2:
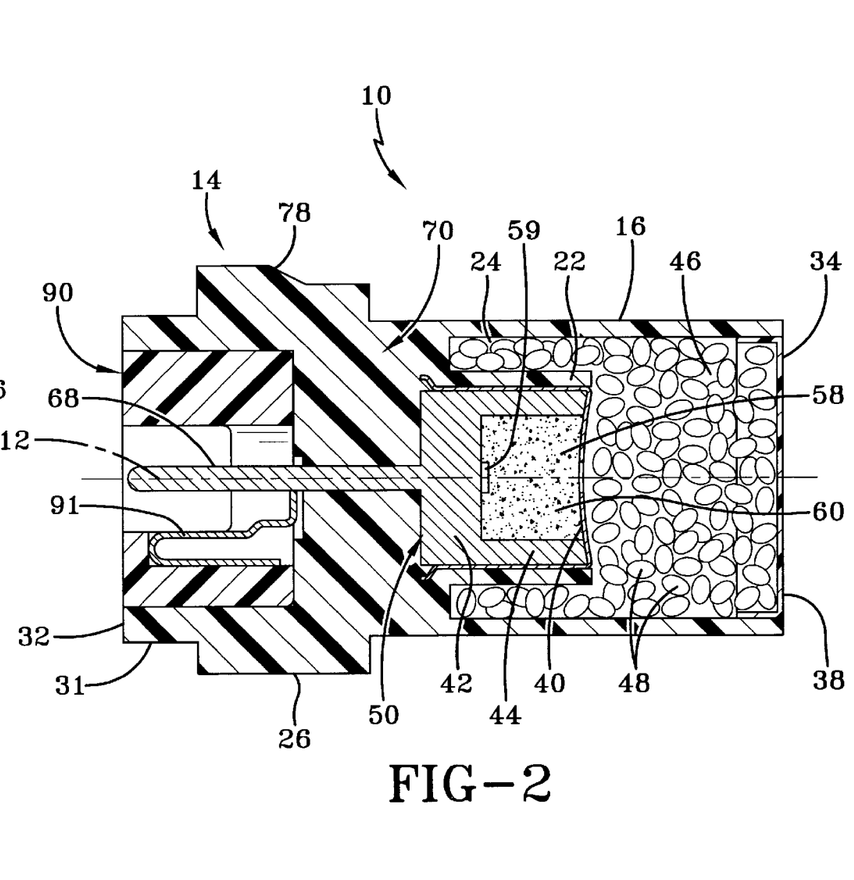
FIG. 2 is a longitudinal cross-sectional view of the embodiment of FIG. 1 taken along line 2—2 of FIG. 1.
Figure 9:
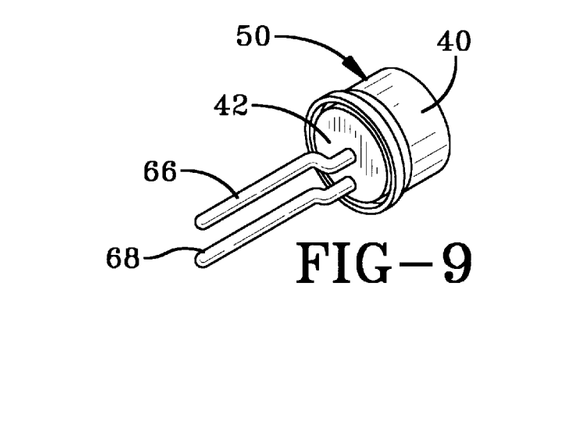
FIGS. 9 to 11 are perspective views of igniters that can be employed in gas generators according to the present invention.

FIGS. 1 and 2 show a first embodiment of a gas generator 10 suitable for use with a vehicle occupant restraint such as a seat belt pretensioner. A gas generator according to the present invention of a size suitable for use with a pretensioner or for opening a vessel containing compressed gas may be relatively small, containing only up to about five grams of a gas generating material. FIG. 1 is an end view of the gas generator and FIG. 2 is a longitudinal cross-sectional view taken along line 2—2 of FIG. 1. The gas generator has a longitudinal axis 12 extending lengthwise through the gas generator. An igniter subassembly 14 comprises an igniter 50 that is molded into a polymeric gas generator body 70. That is to say, a gas generator according to this embodiment is manufactured in part by placing a commercially available igniter 50 of the type shown in perspective in FIG. 9 in a mold and molding a suitable polymeric gas generator body 70 around the igniter to form an igniter subassembly 14.

As used herein, an "igniter" is understood to be any device that will initiate the first fire in the combustion sequence. An igniter may comprise, for example, an electrical device 50 having two electrodes or pins 66, 68 insulated from one another and connected by a heating element 59 such as a bridge wire or semiconductor bridge attached to a header 42 on the side of the header opposite the electrodes 66, 68. A tubular sidewall 44 extends from the header. A seal 40 cooperates with the header and sidewall to define a charge cavity 58 containing a primary pyrotechnic material 60. The seal 40 isolates the primary pyrotechnic material from a gas generant 48. The heating element 59 is embedded in the primary pyrotechnic material 60, or igniter charge. The primary pyrotechnic material is designed to give a flash of heat of sufficient intensity to rupture the seal 40 and ignite the gas generant 48 when electricity is supplied to the heating element 59.

While the structure of a particular igniter has been shown and described, it is understood that any suitable igniter may be used in the practice of the present invention.

Figure 3:
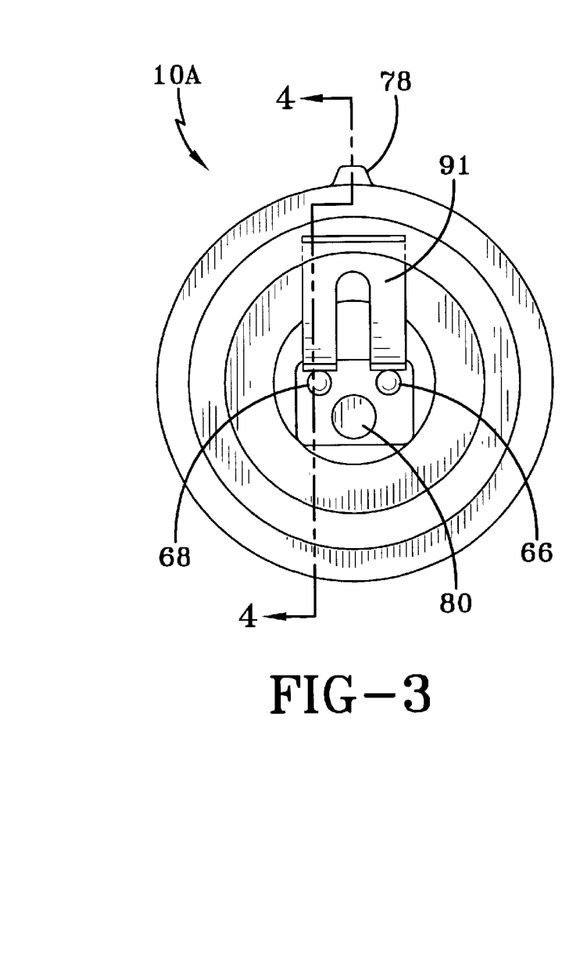
FIG. 3 is an end view of a gas generator according to a second embodiment of the present invention.
Figure 4:
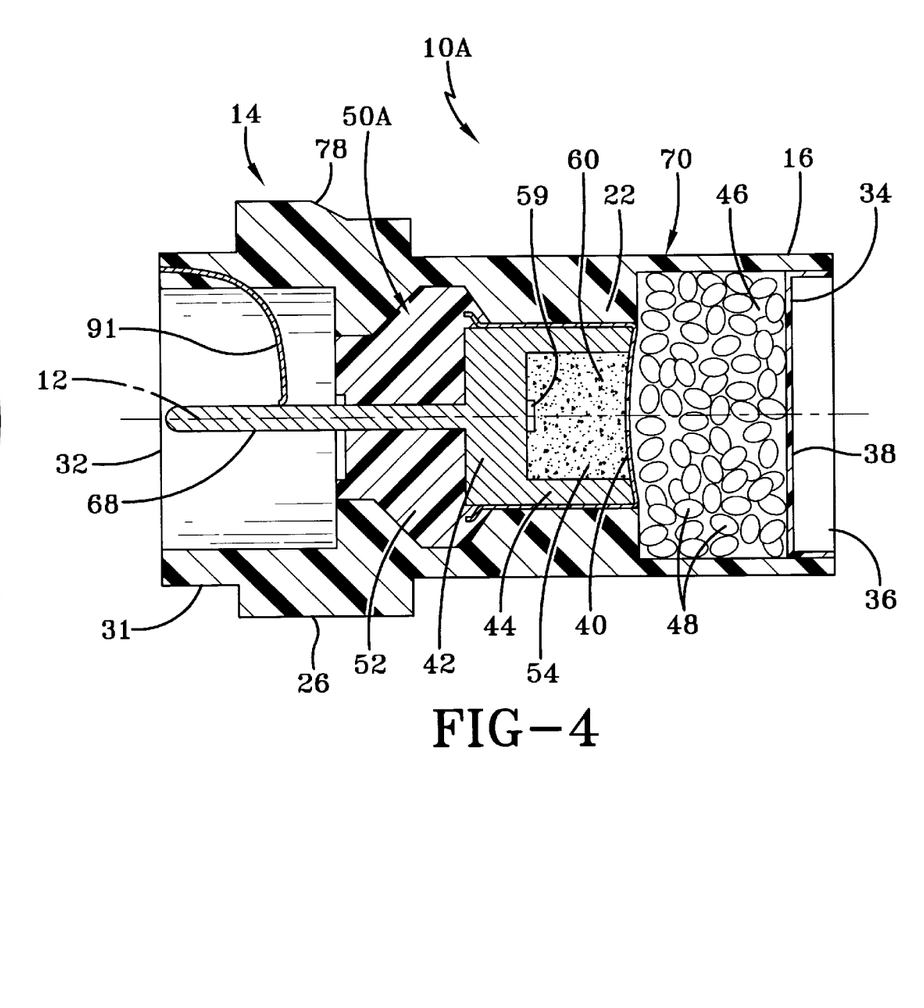
FIG. 4 is a longitudinal cross-sectional view of the embodiment of FIG. 3 taken along line 4—4 of FIG. 3.
Figure 10:
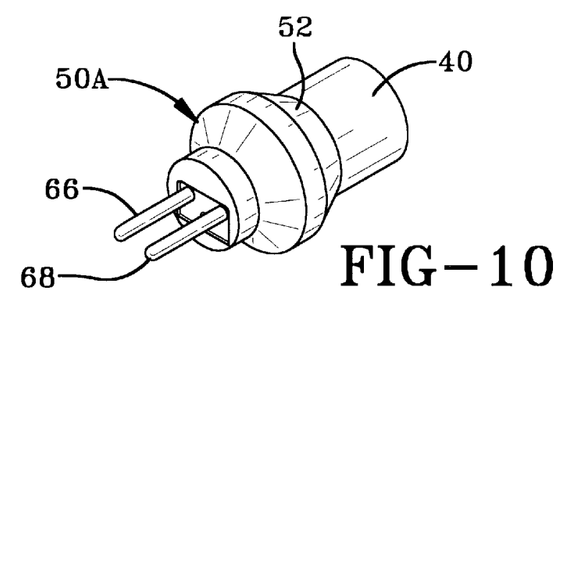

FIGS. 3 and 4 show a second embodiment of a gas generator 10A suitable for use with a vehicle occupant restraint. FIG. 3 is an end view of the gas generator and FIG. 4 is a longitudinal cross-sectional view taken along line 4—4 of FIG. 3. A gas generator according to this embodiment is manufactured in part by placing a commercially available igniter 50A of the type shown in perspective in FIG. 10 in a mold and molding a suitable polymeric gas generator body 70 around the igniter to form an igniter subassembly 14. The only difference between the igniters 50, 50A used in these first two embodiments 10, 10A is that the igniter 50A used in the second embodiment has a plastic overmold portion 52 which is provided by the igniter manufacturer to facilitate assembly of the igniter with a metal gas generator body. The gas generators of the first and second embodiments are substantially the same except for some minor differences that will be pointed out below. Therefore these two embodiments will be described in detail simultaneously with like parts identified by like reference characters.

Figure 12:
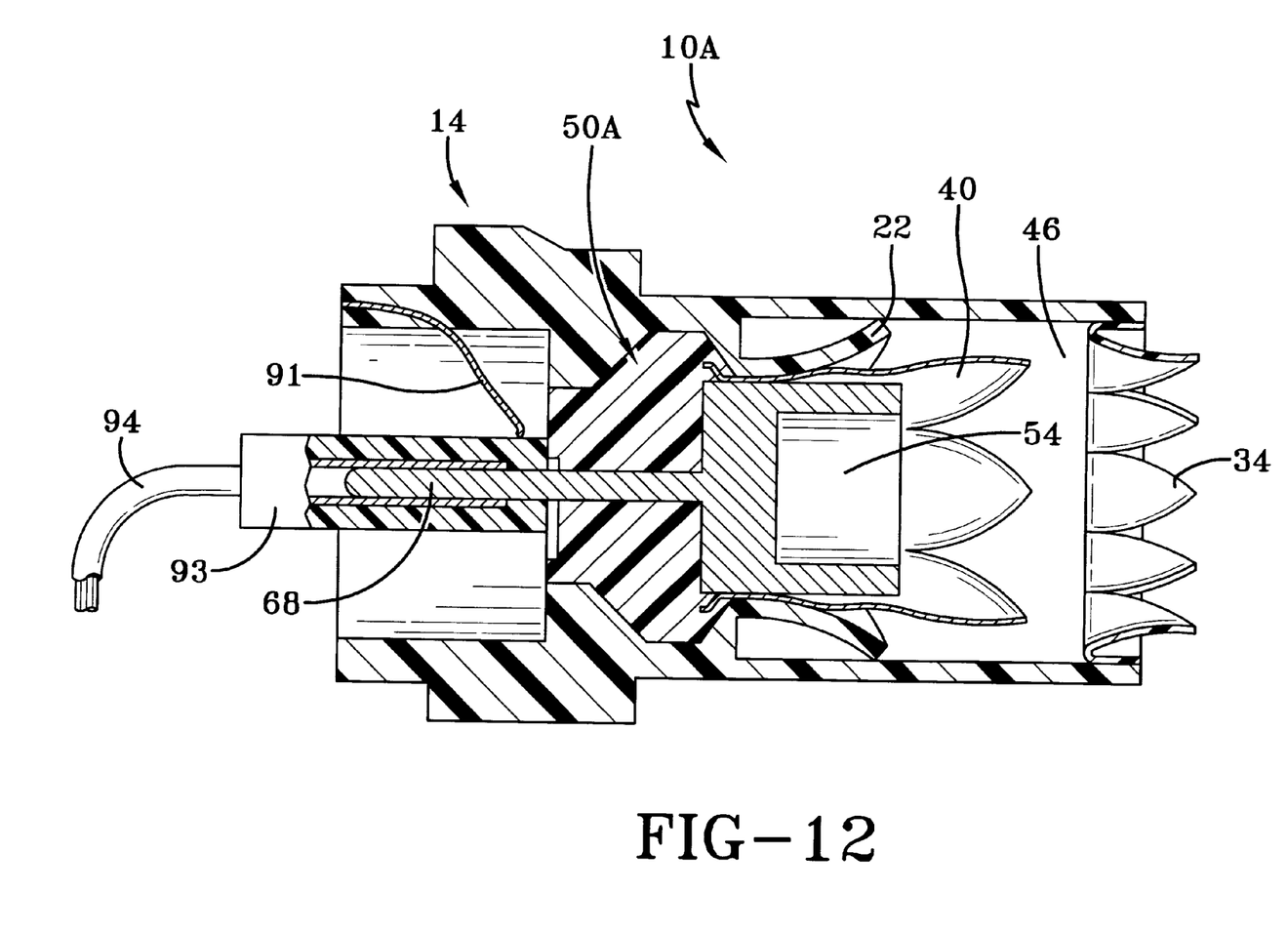
FIG. 12 is a longitudinal cross-sectional view of the igniter shown in FIG. 4 after is has been used to generate gas.

The gas generator 10, 10A has a shorting clip 91 which grounds the gas generator until the igniter 50, 50A is connected to the electrical circuitry of a vehicle. The shorting clip prevents accidental firing of the gas generator. In the embodiment shown in FIGS. 1 and 2 the shorting clip 91 is fixed in a separate housing 90 that is inserted in a recess in the polymeric gas generator body 70 and is indexed into position by tabs 92 located in slots 76 in the polymeric gas generator body. Such a shorting clip passembly is commercially availble. Alternatively, as shown in the embodiment of FIGS. 3 and 4, the shorting clip 91 may be insert molded into the polymeric gas generator body 70. As best shown in FIG. 12, the shorting clip 91 is pushed out of contact with the igniter pins 66, 68 when an electrical connector 93 for connecting the igniter to the electrical system of a vehicle by suitable wiring 94 is pushed onto the igniter pins.

Still viewing FIGS. 1 to 4, the polymeric gas generator body 70 has a tubular combustion chamber wall 16. The combustion chamber wall has an interior surface and an exterior surface. A polymeric closure 34 is formed in a separate injection molding process. A combustion chamber 46 is defined by the igniter 50, 50A, the polymeric gas generator body 70 and the polymeric closure 34.

To prevent the igniter subassembly 14 from cracking during combustion of the gas generant 46, a gas generant such as that described in U.S. Pat. No. 6,071,364, which is incorporated herein by reference, should be used. More specifically, the gas generant should be of the low brisance or non-detonable type. The igniter subassembly 14 should be able to withstand pressurization up to approximately 700 kilograms per square centimeter (10,000 psi) without failure.

The polymeric closure 34 forms a hermetic seal with the igniter subassembly 14 so that the gas generant 48 disposed in the combustion chamber 46 is not exposed to water vapor or other contaminants. As shown in FIGS. 2 and 4 the polymeric closure 34 is an end cap that is U-shaped in cross-section with a closed end 38 and an open end 36. The gas generator 10 shown in FIG. 2 has the end cap located inside the tubular combustion chamber wall 16 with the open end of the polymeric end cap facing the igniter to increase the volume of the chamber as needed. The gas generator 10A shown in FIG. 4 has the has end cap 34 located inside the tubular combustion chamber wall with the closed end 38 of the polymeric end cap 34 facing the igniter 50A to permit removal of unwanted ullage in the combustion chamber 46. It is understood that any arrangement of the closure 34 disclosed in any of the exemplary embodiments disclosed herein can be used with any of the other disclosed embodiments.

Continuing to view FIGS. 2 and 4, the igniter subassembly 14 further comprises a polymeric interior annular portion 22 molded adjacent to the igniter 50, 50A. In the embodiment shown in FIGS. 1 and 2 the polymeric interior annular portion 22 and the combustion chamber wall 16 are spaced apart to form an annular recess 24 which is a part of the combustion chamber 46. No such recess is present in the embodiment shown in FIGS. 3 and 4. The presence of such an annular recess 22 is optional, and the need for such a recess is based upon the amount of gas to be generated in accordance with good engineering practices.

As shown in FIGS. 2 and 4, the igniter subassembly 14 further comprises a polymeric flange 26 that is integrally formed with the polymeric gas generator body 70 and extends radially outwardly therefrom with respect to the longitudinal axis 12 of the gas generator. The polymeric flange 26 adds stability and strength to the gas generator 10 because this flange absorbs energy during combustion. The polymeric flange may be used for seating the gas generator in a vehicle occupant protection device such as a pretensioner (not shown). Also shown in FIGS. 1–4 is an indexing member 78 extending from the flange to aid in properly positioning the gas generator in a vehicle occupant safety device.

A ledge 31 can be used to secure the gas generator 10 to a safety device such as a seat belt pretensioner using a means for securing such as a strip of metal that is crimped about the ledge 31 to hold the gas generator in place.

Figure 5:
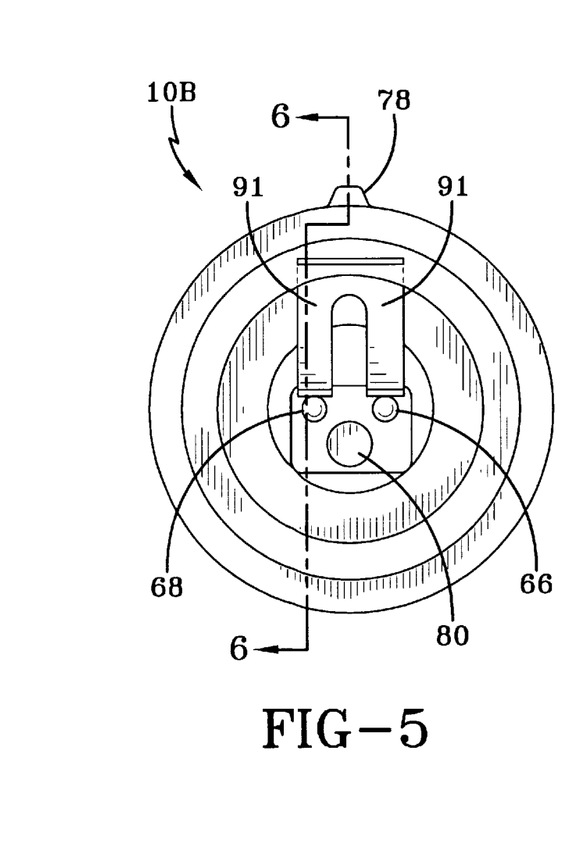
FIG. 5 is an end view of a gas generator according to a third embodiment of the present invention.
Figure 6:
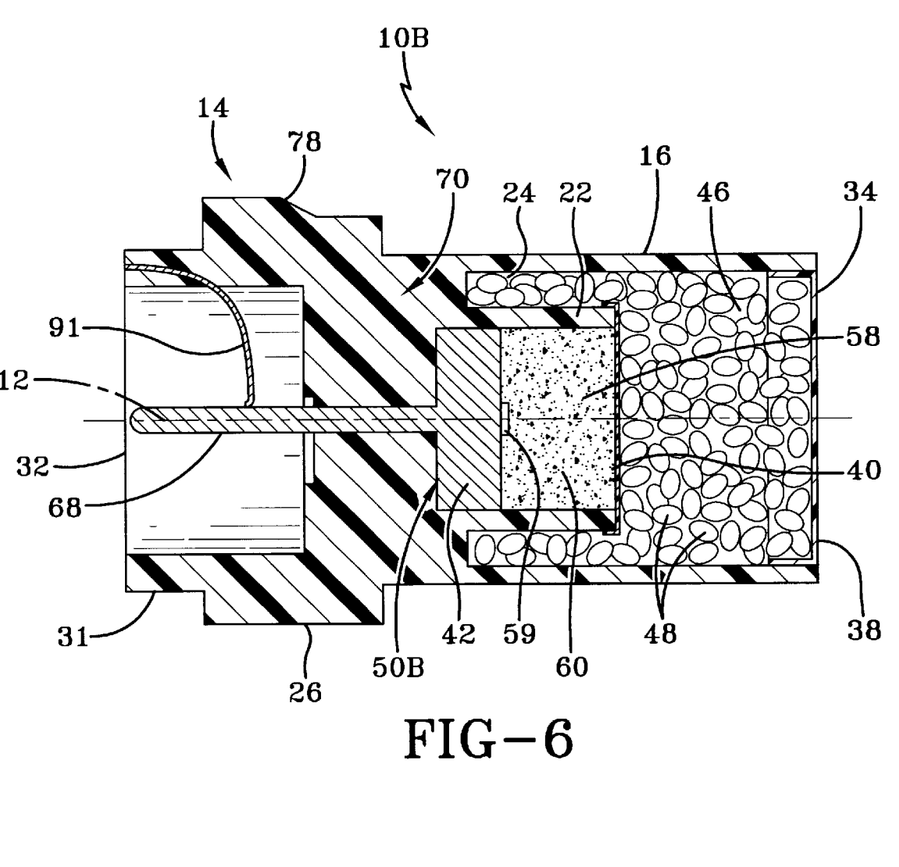
FIG. 6 is a longitudinal cross-sectional view of the embodiment of FIG. 5 taken along line 6—6 of FIG. 5.
Figure 11:
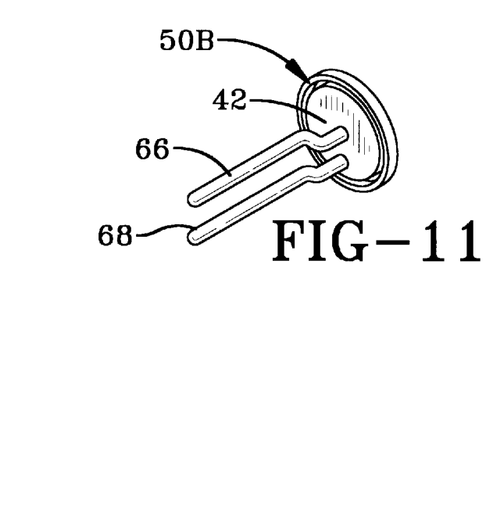

FIGS. 5 and 6 show a third embodiment of the present invention wherein an igniter 50B is integrally formed with the igniter subassembly 14. FIG. 5 is an end view of the gas generator 10B and FIG. 6 is a longitudinal cross-sectional view taken along line 6—6 of FIG. 5. A gas generator according to this embodiment is manufactured in part by placing a commercially available igniter header assembly 50B of the type shown in perspective in FIG. 11 in a mold and molding a suitable polymeric gas generator body 70 around the igniter to form an igniter subassembly 14. More specifically, the igniter header assembly 50B has first and second conductor pins 66, 68 and a header 42 having a heating element 59 assembled therewith on the side of the header opposite the side from which the pins 66, 68 extend.

The header assembly does not come with a tubular sidewall 44 extends from the header as in the previously described igniters 50, 50A. The polymeric interior annular portion 22 of the igniter subassembly 14 previously described performs the function of the tubular sidewall as a structural member to help define the charge cavity 58 of the igniter 50. After the igniter subassembly 14 has been molded, the primary pyrotechnic material 60 is loaded into the charge cavity 58 and a seal 40 is placed over the opening in polymeric interior annular portion 22 and cooperates with the header and polymeric interior annular portion to define the a charge cavity 58 containing the a primary pyrotechnic material 60. The seal 40 isolates the primary pyrotechnic material from a gas generant 48. In all other respects the embodiment of FIGS. 5 and 6 is similar in structure and operation to the embodiments already described with reference to FIGS. 1–4.

Figure 7:
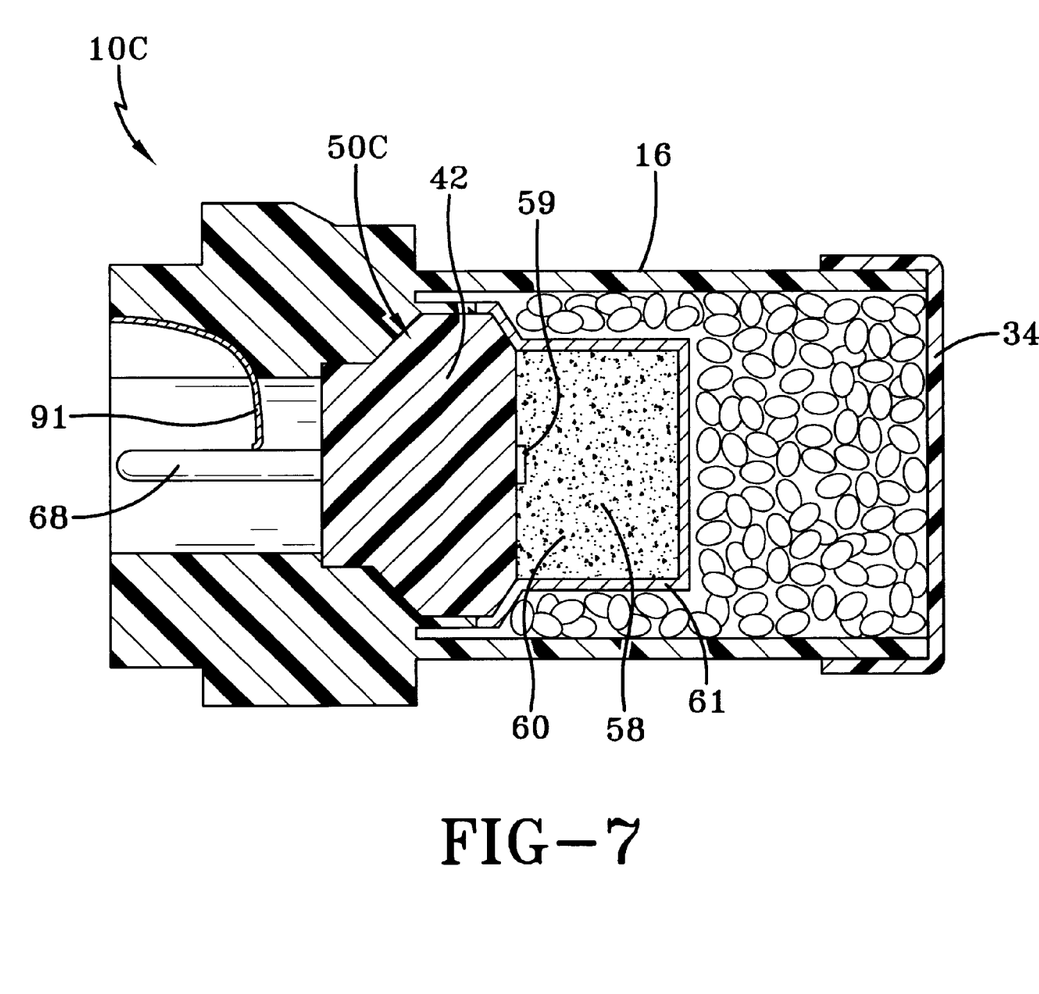
FIG. 7 is a longitudinal cross-sectional view of a gas generator according to a fourth embodiment of the present invention.

FIG. 7 is a longitudinal cross-sectional view of a gas generator 10C according to a fourth embodiment of the present invention, wherein the polymeric end cap 34 fits over the igniter subassembly 14, forming a hermitic seal between the interior surface 36 of the polymeric end cap 34 and the exterior surface 20 of the combustion chamber wall 16. The igniter used in this embodiment comprises a metal cup 61 that first has a primary pyrotechnic material 60 is placed in the cup and thereafter a header assembly is inserted into the open end of the cup and secured thereto. The header 42 and heating element 59 cooperate with the cup 61 to form the charge cavity 58. In all other respects the embodiment of FIG. 7 is similar in structure and operation to the embodiments already described with reference to FIGS. 1–6.

Figure 8:
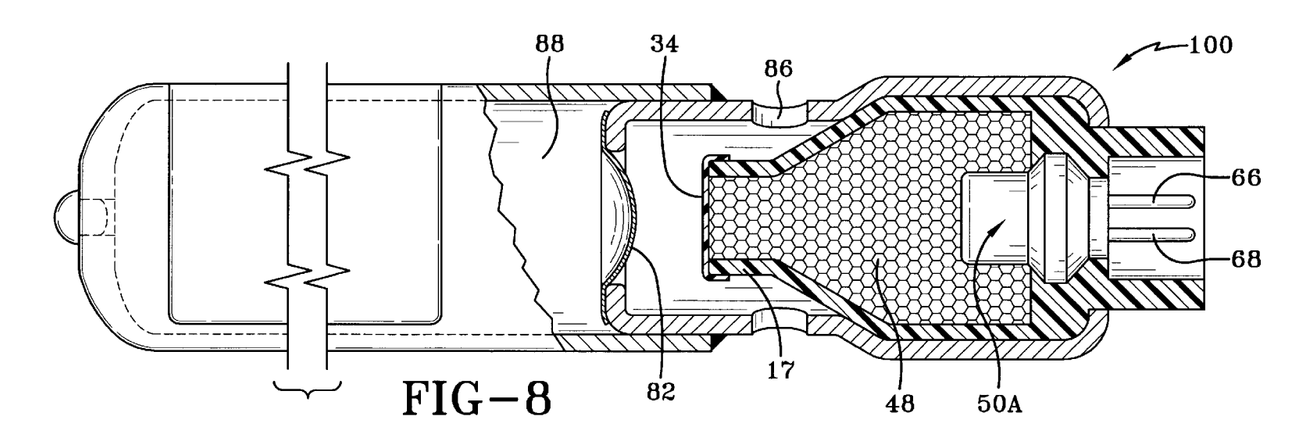
FIGS. 8 and 8A are side views, partially broken away, of gas generators according to the present invention employed as an opener for a vessel of compressed gas.

Technology as previously described can be used to produce openers for compressed gas vessels 100 as shown in FIG. 8, which is a side view, partially broken away, of a gas generator according to the present invention employed as an opener for a vessel of compressed gas. It is understood that a gas generator according to any of the embodiments already may be used to open a vessel of compressed gas in the manner that is about to be described. Preferably the polymeric gas generator body has a necked down portion 17 which is closed by a polymeric closure 34 as described above. The activation of the igniter 50A and combustion of the gas generant 48 occurs as previously described. As the gas pressure builds up inside the combustion chamber the polymeric closure ruptures and allows a jet of hot combustion gas to exit the opener impinging on a burst disk 82. The burst disk 82 retains compressed gas in the compressed gas vessel chamber 88. When the jet of hot gas strikes the burst disk 82 failure occurs as a result of thermal stress, melting or the force of the gas impinging the burst disk. Failure of the burst disk allows the compressed gas to escape through exit ports 86 to inflate an airbag or other safety device, or for any other suitable use of the compressed gas.

Figure 8A:
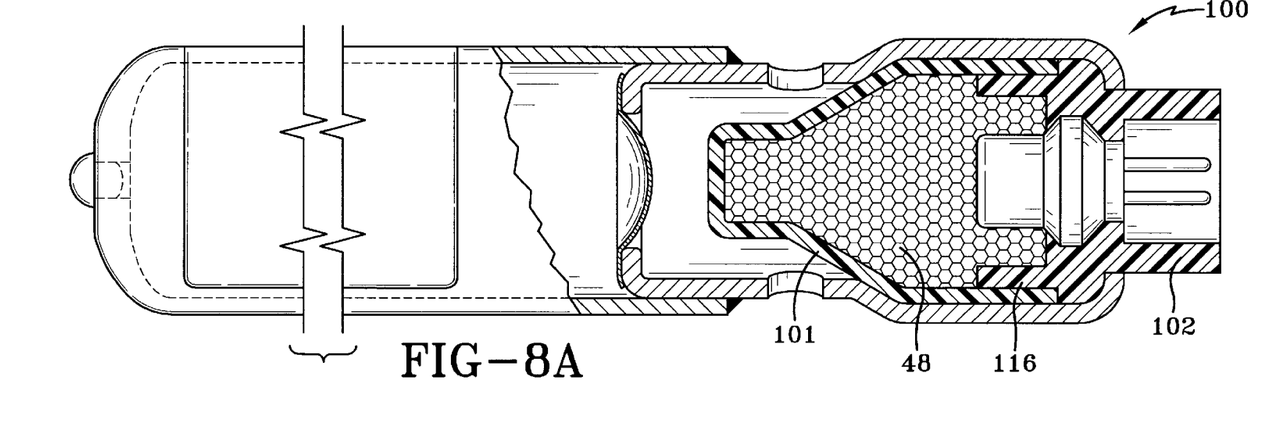

FIG. 8A is a side view, partially broken away, of another gas generator according to the present invention employed as an opener for a vessel 100 of compressed gas in the same manner described above with reference to FIG. 8. The gas generator employed in this embodiment is like that shown in FIG. 8 except that the tubular combustion chamber wall 116 of the igniter subassembly 102 is shorter than in the other embodiments disclosed herein. However, the polymeric closure 101 is larger than in the other embodiments disclosed herein. The gas generant 48 is placed in the cup shaped polymeric closure 101 and then the igniter subassembly 102 is assembled with the polymeric closure 101 with the tubular combustion chamber wall 116 located inside of the polymeric closure. Thus a combustion chamber containing a gas generant is defined by the polymeric gas generator body, the igniter, and the polymeric closure as in the other embodiments.

The operation of a gas generator according to any embodiments of the invention can be described with reference to FIGS. 3, 4 and 12. FIG. 12 is a longitudinal cross-sectional view of the igniter shown in FIG. 4 after it has been used to generate gas. Once installed in the appropriate vehicle occupant safety device, the gas generator 10A remains in a non-activated condition until receiving an activation signal from the vehicle's electrical circuitry. When a predetermined threshold for deceleration is exceeded, or when a vehicle is in a crash, a sensor (not shown) sends an electrical current through a wire 94 and electrical connector 93 to the igniter 50A. The electrical current is received by the electrical connecting pins 66, 68. The electrical current travels through the pins and the heating element 59. The electrical current heats the heating element, which then in turn ignites the primary pyrotechnic material 60. Ignition of the igniter charge 60 ruptures the seal 40 of the charge cavity 54 of the igniter 50A. The hot temperature of the combusted primary pyrotechnic material 60 then ignites the gas generant 48 disposed in the combustion chamber 46. As the gas generant combusts, hot gases cause the pressure to increase inside the chamber. This increased pressure causes the polymeric closure 34 to rupture or break away from the igniter subassembly 14. Gas then escapes and moves an associated piston of a seat belt pretensioner system, or another safety device, or open a vessel containing gas.

To manufacture a gas generator according to the present invention a plastic injection molding process is utilized, which is well known in the art. A mold (not shown) is provided and positioned in an injection molding apparatus (not shown). The igniter 50, 50A, 50C or header assembly 50B is positioned in the mold using a positioning mechanism 80. As best shown in FIGS. 3 and 5, the positioning mechanism 80 is a recess located between and below the first and second electrical pins 66, 68. The positioning mechanism 80 properly orientates the electrical connecting pins in the mold before the polymer is injected therein to form the igniter subassembly 14. Once these components are in position, the mold is closed. A molten, flowable polymeric material is then injected into the mold. The polymeric material flows around the igniter 50, 50A, 50C or header assembly 50B to form an igniter subassembly. Once the polymeric material has sufficiently cooled, the igniter subassembly is released from the mold. The combustion chamber 46 is then filled with a gas generant 48. Once the combustion chamber has been adequately filled, the polymeric closure 34 is hermetically sealed to the combustion chamber wall 16. If it has not been injected molded into the igniter subassembly, the shorting clip 76 is attached to the gas generator to prevent premature firing of the same. Once the gas generator has been transported to its installation destination, the requisite electric circuitry is then connected to the first and second pins 66, 68 of the igniter of the gas generator.

With the given geometry of the present invention, a gas generant enhancer is not required to ignite the gas generant. When the igniter charge flashes, enough thermal energy is produced to ignite the gas generant disposed in the chamber. Of course, a gas generant enhancer may be utilized in conjunction with the gas generant, but it is not absolutely necessary.

As previously mentioned, polymeric gas generators have not been developed because of the severe stress that the combustion of the gas generant places on the structure. Gas generators in accordance with the present invention have been manufactured with glass fiber reinforced nylon 6/6 as the polymeric material. One possible problem with this polymeric material is that it may be slightly permeable to moisture, which can be detrimental to some gas generating materials. Other polymeric materials that are believed to be useful in the practice of the present invention are: acrylo nitrile butadyene (ABS), polyetheramides (Ultem®), polyphenyline oxide (Norel®), and polyarylamide. Of course any other suitable polymeric material may be used, which has high temperature properties that do not result in failures during the combustion phase. Once the crash sensor sends a signal to the gas generator 10, the pressure therein increases from zero to about 422 kilograms per square centimeter (6,000 psi) in approximately six to fourteen milliseconds.

From the foregoing, it will be apparent to those skilled in the art that modifications may be made without departing from the spirit and scope of the invention. Accordingly, the invention is not intended to be limited except as may be made necessary by the appended claims.

What is claimed is:

1. A gas generator comprising:
    an igniter subassembly comprising an igniter for receiving an electrical current and having one igniter charge for igniting a gas generant, the igniter is molded into a polymeric gas generator body having a combustion chamber wall, igniter subassembly further comprises a polymeric flange integrally formed with said polymeric gas generator body and extending radially therefrom; and a polymeric interior annular portion extending into a combustion chamber to substantially an end of a tubular side wall of the igniter, said polymeric annular portion forming an annular recess with an interior wall of said combustion chamber wall, said annular recess forming a part of said combustion chamber;
    a polymeric closure attached to said polymeric gas generator body;
    the combustion chamber for receiving a gas generant, said combustion chamber defined by said igniter, said polymeric closure and said polymeric combustion chamber wall; and
    one gas generant disposed in said combustion chamber, wherein the gas generant and the igniter charge are the only two pyrotechnic materials in the gas generator, wherein the igniter charge is isolated from the gas generant by a seal.

2. The gas generator of claim 1 wherein said combustion chamber is hermetically sealed.

3. The gas generator of claim 1 wherein said closure is hermetically sealed to the interior of said polymeric combustion chamber wall.

4. The gas generator of claim 1 wherein said polymeric closure and polymeric gas generator body comprise nylon 6/6.

5. A gas generator, comprising:
    a longitudinal axis;
    an igniter subassembly comprising
        an igniter for receiving an electrical current and having one ignition charge for igniting a gas generant, the igniter is molded in a polymeric gas generator body,
        a combustion chamber wall that partially defines a combustion chamber,
        a polymeric flange integrally formed with said polymeric gas generator body and extending radially outward therefrom, and
        a polymeric interior annular portion extending into said combustion chamber to substantially an end of a tubular side wall of the igniter, said annular portion forming an annular recess with an interior wall, said annular recess forming a part of said combustion chamber;
    a polymeric closure hermetically sealed to said igniter subassembly;
    said combustion chamber defined by said igniter, said polymeric closure and said igniter subassembly;
    one gas generant disposed in said combustion chamber, wherein the gas generant and the igniter charge are the only two pyrotechnic materials in the gas generator, wherein the igniter charge is isolated from the gas generant by a seal.

* * * * *